US006934625B2

(12) United States Patent
Haddad

(10) Patent No.: US 6,934,625 B2
(45) Date of Patent: Aug. 23, 2005

(54) TRACKING SYSTEM AND METHOD

(75) Inventor: Wassim Haddad, Helsinki (FI)

(73) Assignee: Hewlett-Packard Development Company, L.P., Houston, TX (US)

( * ) Notice: Subject to any disclaimer, the term of this patent is extended or adjusted under 35 U.S.C. 154(b) by 26 days.

(21) Appl. No.: 10/388,144

(22) Filed: Mar. 13, 2003

(65) Prior Publication Data

US 2003/0210143 A1 Nov. 13, 2003

(30) Foreign Application Priority Data

Mar. 13, 2002 (GB) ............................................. 0205883

(51) Int. Cl.[7] ................................................ G01C 21/26

(52) U.S. Cl. ....................... 701/201; 701/207; 701/214; 701/300; 340/357.07; 340/357.08

(58) Field of Search ................................ 701/201, 207, 701/214, 216, 222, 300; 340/988; 342/357.07, 357.08, 357.09, 357.12

(56) References Cited

U.S. PATENT DOCUMENTS 4,674,408 A * 6/1987 Stessen ....................... 102/384
5,767,804 A 6/1998 Murphy
6,094,164 A 7/2000 Murphy
6,327,219 B1 12/2001 Zhang et al.
6,487,992 B1 * 12/2002 Hollis ........................ 119/712

FOREIGN PATENT DOCUMENTS

GB 2360588 A 9/2001
WO WO95/22131 8/1995
WO WO98/01769 1/1998

* cited by examiner

*Primary Examiner*—Gertrude A. Jeanglaude

(57) ABSTRACT

A tracking system comprises an arming unit, a motion sensor, a direction sensor, a processor, and a transceiver. The arming unit is switchable so as to place the tracking system in either an armed state or an unarmed state. The motion sensor is arranged to activate the tracking system when the system is in an armed state and motion is detected. The direction sensor and the motion sensor output signals indicative of the direction of travel and distance travelled, respectively, to the processor when the system is activated. The processor acts upon said signals so as to generate an output indicative of the distance and direction of travel. The transceiver actuable to transmit the output of the processor to a remote base station in order that the position of a tracked object can be monitored remotely.

27 Claims, 3 Drawing Sheets

TRACKING SYSTEM AND METHOD

BACKGROUND OF THE INVENTION

1. Field of the Invention

This invention relates to a tracking system and tracking method. More particularly, but not exclusively, it relates to a tracking system and method that is operable upon an unauthorised movement of an object, for example a motor vehicle.

2. Description of the Related Art

The tracking of stolen motor vehicles is well known and techniques for doing so range from the concept of an alarm sounding from which a vehicle can be audibly tracked to the use of the Global Positioning System (GPS) to track vehicles once they are known to be stolen.

An audible alarm is primarily a deterrent with notification of the presence of the alarm being intended to be sufficient to ward off casual or petty thieves. However, determined or professional car thieves will typically be able to disable most audible alarms either before stealing the vehicle, by use of infrared code scanners, or manually within seconds of effecting entry to the vehicle, thus giving the impression of a fake alarm or an accidental actuation of the alarm by the vehicle's owner.

GPS tracking systems suffer from the problem that it is necessary to have three satellites within a line of sight of the vehicle in order to be able to accurately determine the position of the vehicle. This is not always possible in the urban environment, particularly in cities, due to the surrounding buildings. This can lead to the inaccurate determination of the location of the stolen vehicle, or an imprecise location.

Another drawback of GPS tracking systems is that the owner must know that the vehicle has been stolen prior to the system being activated. This can give the thief a significant amount of time to get away and even cross jurisdictional boundaries.

WO 95/22131 discloses a tracking device in which signal strengths and identification information from cellular transmitters received at the device are retransmitted to a remote monitoring station along with information relating to the direction and distances travelled by the vehicle. A computer at the remote monitoring station determines the position of a vehicle using the information transmitted from the device. The direction and distance information is typically used when the vehicle cannot receive adequate signals from the cellular transmitters to triangulate.

U.S. Pat. No. 5,767,804 and U.S. Pat. No. 6,094,164 disclose a tracking system using radio direction finding and a GPS receiver.

WO 98/01769 discloses a tracking system using a GPS receiver and a gyroscope.

U.S. Pat. No. 6,327,219 discloses a system for directing a following device toward a moveable object using radio frequencies and an ultrasonic signal.

GB 2360588 discloses a navigation system for directing a user to a destination using GPS.

SUMMARY OF THE INVENTION

According to a first aspect of the present invention there is provided a tracking system, which is adapted to track an object independently of the processing of directionally dependent broadcast signals, comprising an arming unit, a motion detection device, a direction detection device, processing circuitry, a transmitter and an activation device; the arming unit being switchable so as to place the tracking system in either an armed state or an unarmed state, the activation device being arranged to activate the tracking system when the system is in an armed state, the direction detection device and the motion detection device being arranged to output signals indicative of the direction of travel and distance travelled, respectively, to the processing circuitry when the system is activated, the processing circuitry being arranged to act upon said signals so as to generate an output indicative of the distance and direction of travel, the transmitter being actuable to transmit the output of the processing circuitry to a remote receiving station.

This arrangement allows, in some embodiments, the instantaneous commencement of tracking of, for example, a motor vehicle as soon as it is used or starts to move and the tracking system is armed. As the system requires no visible or audible output it can be concealed and is therefore not easily circumvented. Also the system does not rely upon any external signal sources, such as satellites in GPS, or land based or triangulation signals. The system can therefore be operated in urban environments where multiple reflections and variations in the path between a transmitter and the system, for example the construction of a new building, can lead to inaccuracies in position determination using such methods as triangulation based upon received signal direction or signal strength measurements. Additionally, the lack of reliance upon external signal sources allows the system to be utilised in rural areas where transmitter coverage is poor or non-existent.

The removal of the necessity for triangulation measurements reduces the complexity of construction of the system compared to prior art systems as signal strength measurement circuitry can be omitted. Also the processing power required at the remote receiving station is reduced over prior art devices as there is no need to perform a comparison of signal strengths in order to determine the location of the system.

The arming unit may be a key and lock arrangement. Alternatively, the arming unit may be an infrared transmitter and receiver arrangement. The infrared transmitter may include a signal coder and the infrared receiver may include a complementarily arranged signal decoder.

This allows, in the case of, for example, a motor vehicle driver to arm the system upon exiting the vehicle by, for example, locking the doors by either using a key and lock arrangement or an infrared remote locking arrangement.

The activation device may be any one, or combination of, the following: the motion detection device, the direction detection device, an engine monitoring device (for example a rev counter), a vibration sensing device, an engine emission sensing device, a braking sensing device (for example a handbrake).

The motion detection device may be a distance meter, for example an odometer, or a cable attached to an odometer, an axle or a wheel, Alternatively or additionally the motion detection device may include velocimeter and/or an accelerometer. The velocimeter and/or the accelerometer may have a complementary clock coupled thereto. The motion detection device may include an inertia activated motion switch. The motion detection device may be electronic, preferably digitised.

In the case of an odometer the distance travelled can be directly measured, typically to an accuracy of 0.1 km, 0.05 km or better. For a velocimeter or accelerometer, the fact that motion has started is readily detected. However, a complementary clock must be coupled thereto in order to determine the distance travelled. The use of a discrete velocimeter/accelerometer arrangement such as an inertial arrangement that is not connected to a drive mechanism allows a vehicle's motion to be tracked even if it is loaded onto a truck before being moved as it is not dependent upon the vehicle being driven.

The arming unit may be arranged to reset a counter in the the processing circuitry that is arranged to receive the signal input to the the processing circuitry from the motion detection device upon being switched to the armed state.

This arrangement resets the measured distance travelled each time the system is armed so that the total distance measured from activation of the system is a true reflection of the distance travelled.

The direction detection device may be a compass. Alternatively or additionally the direction detection device may be a gyroscope. The direction detection device may be electronic, preferably digitised.

The direction detection device may be arranged to output the signal indicative of the direction of travel to the processing circuitry either periodically or upon a significant change in direction. The time between the output of the signal may be between any pair of the following: 0.1 s, 1 s, 5 s, 10 s, 30 s, 1 min, 5 min, 15 min. A significant change of direction may be a variation in heading of between any pair of the following values: 0°, 10°, 20°, 30°, 45°, 60°, 90°, 180°, 270°, 360°.

This arrangement allows for only the periodic transmission of information to the remote receiving station thereby reducing the data transmission across a network and thereby minimising cost. Thus the transmitter may be arranged to transmit data as any one of: a burst of a single distance/direction pair, a plurality of distance/direction pairs or a continual feed of distance/direction pairs. The upload of a history of movement of an object including the system in a burst of data allows the retracing of a vehicles movement during a period in which the transmitter may have been switched off. This is not an option when the device only transmits a continuous stream of data detailing the present location of the vehicle. This may be of significance, for example, when proving that a vehicle was used in a crime in a period when the transmitter was not active. It may be possible to request the device (wirelessly and remotely) to output a report logging its past movements/positions.

The transmitter may be arranged to transmit a signal to the base station that is indicative of the overall distance travelled and the net direction of travel since the activation of the tracking system.

The transmitter may be any one or combination: of the following: a global system for telecommunication (GSM) transceiver, a general packet radio service (GPRS) transceiver or a third generation (3G) cellular transceiver. The transmitter may be arranged to transmit any one, or combination, of the following to the remote base station: SMS text message, e-mail, voice message. The transmitter may be arranged to open a channel to the remote receiving station periodically, or it may maintain an open channel to the remote receiving station, once the system has been activated. The transmitter may be arranged to open a channel to the remote receiving station covertly whilst the tracking system is activated.

The use of cellular telecommunications infrastructure allows a variety of formats of data to be transmitted. In particular with GPRS and 3G where users are billed on the basis of their use of bandwidth rather than their usage time it is feasible to maintain a low data rate channel open almost permanently for minimal cost to the user.

The transmitter may be arranged to receive a signal from a waymarker. The waymarker's signal may contain details of its geographical location. The processing circuitry may be arranged to reset the counter therein when the transmitter receives the signal from the waymarker. The transmitter may be arranged to transmit the details of the waymarker's geographical location to the remote receiving station.

Waymarkers are typically short range transmitters at the side of the road, for example, at motorway junctions, that broadcast their exact location over a small area. Such a signal would not be directionally dependent but typically would broadcast locational information to devices within a short range, typically 100 m, that they were at a specific location, for example a specific freeway off-ramp. The distance measurement may then be reset and cumulative errors associated with such a measurement are avoided. Similarly, the waymarker may be arranged to broadcast very short range signal, for example of the order of 5 m, 10 m, 20 m or so, such that it encompasses only a number of lanes of traffic, for example traffic travelling in one direction. Such a signal may contain details of direction of travel, for example Westbound versus Eastbound, and the direction measurement can be reset. The retransmission of the information transmitted by the waymarker to a remote receiving station by the device allows periodic updates of the position of the vehicle without requiring computationally intensive calculations to be carried out.

Waymarkers can be used to reset the "distance counter" and provide new datums for calculating the distance travelled and direction of travel. This aims to obviate the inherent problems of inaccuracies in distance meters and compasses/gyroscopes which will always drift over time.

The processing circuitry may be a central processor unit (CPU) with associated memory. The processing circuitry may have a data file corresponding to a map stored therein. The processing circuitry may be arranged to determine the distance and direction travelled from a known location in order to ascertain co-ordinates on the map of the systems location. The processing circuitry may be arranged to pass the co-ordinates to the transmitter, which may be arranged to transmit the co-ordinates to the remote receiving station.

This allows, for example, a stolen vehicle to be tracked with reference to a known location on a reference map. The known location can be the last known position of the vehicle or a known waymarker. Thus, the exact location of the vehicle can be passed to the receiving station. The vehicle may always track itself.

The arming unit may be a keyboard. The keyboard may be arranged to enter a code to the processing circuitry. The keyboard may be arranged to enter a numerical value to the processing circuitry. The numerical value may be a value read from the motion detection device.

The keyboard allows arming and disarming codes to be entered into the system. Additionally if, for example, a vehicle does not have a digital distance meter, from which a reading can be automatically scanned by the the processing circuitry, the keyboard allows a distance reading to be entered into the system upon which the distance travelled once the system is activated is then based.

The remote receiving station may be a mobile telecommunications device such as, for example, a telephone or a personal digital assistant (PDA). Alternatively, or additionally, the remote receiving station may be a computer, for example a PC. The remote receiving station may be situated in a law enforcement agency's office, a company's office or a users home. There may be a plurality of remote receiving stations arranged to receive the transmission from the transmitter.

The use of a mobile device, for example a mobile, telephone, allows an owner of, for example, a vehicle being tracked to be directly notified of the vehicle's location. Alternatively, details of the vehicles journey can be downloaded to a PC, for example, to allow sales reps journey details to be checked against their claimed journeys.

There may be a plurality of tracking systems distributed about an object to be tracked. The plurality of tracking systems may be comprised of dissimilar components. This allows for a tracking system to be placed where it can be easily discovered thus lulling a thief whilst they are still tracked by a better concealed tracking system.

The system may be housed in a motor vehicle and may be arranged to track the motor vehicle when activated.

According to a second aspect of the present invention there is provided a method of tracking an object comprising the steps of:

(i) activating a tracking system;

(ii) measuring the direction and distance of travel; and (iii) transmitting the direction and distance of travel to a remote receiving station.

The method may include estimating the objects current location from its last known position and the aggregate direction and distance of travel.

The method may include activating the tracking arrangement by a signal from a motion detection device or other object use detection means. The method may include providing the motion detection device in the form of any one, or combination of the following: a velocimeter, accelerometer, a distance meter. The method may include combining the motion detection device with a clock, for example, to measure the distance of travel. The method may include measuring the direction of travel using either a compass and/or a gyroscope. The method may include measuring the direction and distance of travel using an electronic device, preferably a digital device.

The method may include activating the tracking arrangement by means of any one, or combination of the following: infrared transceiver arrangement, lock and key arrangement, keyboard.

The method may include transmitting the direction and distance of travel periodically, for example every 30 s. The method may include transmitting a burst of direction and distance information relating to the period since the last transmission. Alternatively, or additionally, the method may include transmitting the direction and distance of travel at any significant change of direction. The method may include defining a significant change of direction as being a variation between and pair of the following values: 0°, 10°, 20°, 30°, 45°, 60°, 90°, 180°, 270°, 360°.

The method may include transmitting the direction and distance of travel using any one, or combination of the following telecommunications standards: GSM, GPRS, 3G. The method may include transmitting the direction and distance of travel using any one, or combination, of the following: SMS text message, e-mail, voice message. The method may include opening a communication channel to the remote receiving station, from the object periodically. Alternatively the method may include maintaining a permanently open communication channel between the object and the remote receiving station once the system has been activated.

The method may include receiving a signal from a waymarker by the tracking system. The method may include containing within the signal details of the waymarker's geographical location. The method may include transmitting details of the waymarker's geographical location to the remote receiving station. The method may include providing a distance meter in the system and may include resetting the distance meter upon receiving a signal from a waymarker.

The method may include providing the processing circuitry containing a data file corresponding to a map therein and may include determining the distance and direction travelled from a known point in order to ascertain co-ordinates on the map of the objects location. The method may include transmitting the co-ordinates to the remote receiving station.

The method may include providing the remote receiving station in the form of a mobile telecommunications device, such as, for example, a telephone or a PDA. Alternatively, or additionally the method may include providing the remote receiving station in the form of a computer.

According to a third aspect of the present invention there is provided a motor vehicle including a tracking system according to the first aspect of the present invention.

According to a fourth aspect of the present invention there is providing a program storage device readable by a machine and encoding a program of instructions which when operated upon the machine cause the machine to act as the tracking system according to the first aspect of the present invention.

According to a fifth aspect of the present invention there is provided a computer readable medium having stored therein instructions for causing a system to execute the method of the second aspect of the present invention.

According to a sixth aspect of the present invention there is provided a tracking system for tracking an object comprising an arming unit, a motion detection device, a direction detection device, processing circuitry, a transmitter and an activation device; the arming unit being switchable so as to place the tracking system in either an armed state or an unarmed state, the activation device being arranged to activate the tracking system when the system is in an armed state, the direction detection device and the motion detection device being arranged to output signals indicative of the direction of travel and distance travelled, respectively, to the processing circuitry when the system is activated, the processing circuitry being arranged to act upon said signals so as to generate an output indicative of the distance and direction of travel, the transmitter being actuable to transmit the output of the processing circuitry to a remote receiving station, the processing circuitry not being adapted to perform either of signal strength measurements or direction of signal determinations, upon at least two signals received from each of a plurality of transmitters in order to triangulate the position of the object.

Thus, such a system does not rely on triangulation of broadcast signals in order to determine the location of the object. Instead of measuring signal strengths from known transmitters or determining the direction of known transmitters this system relies upon measuring the direction of travel and the distance travelled from a previously known location.

According to a seventh aspect of the present invention there is provided tracking system, which tracks an object independently of the processing of directionally dependent broadcast signals, comprising an arming unit, an accelerometer, a compass, processing circuitry, and a cellular transceiver; the arming unit being switchable so as to place the tracking system in either an armed state or an unarmed state, the accelerometer being arranged to activate the tracking system when the system is in an armed state, the compass and the accelerometer being arranged to output signals indicative of the direction of travel and distance travelled, respectively, to the processing circuitry when the system is activated, the processing circuitry being arranged to act upon said signals so as to generate an output indicative of the distance and direction of travel, the cellular transceiver being actuable to transmit the output of the processing circuitry to a remote receiving station.

BRIEF DESCRIPTION OF THE DRAWINGS

The invention will now be described, by way of example only, with reference to the accompanying drawings, in which.

DESCRIPTION OF THE PREFERRED EMBODIMENTS

Figure 1:
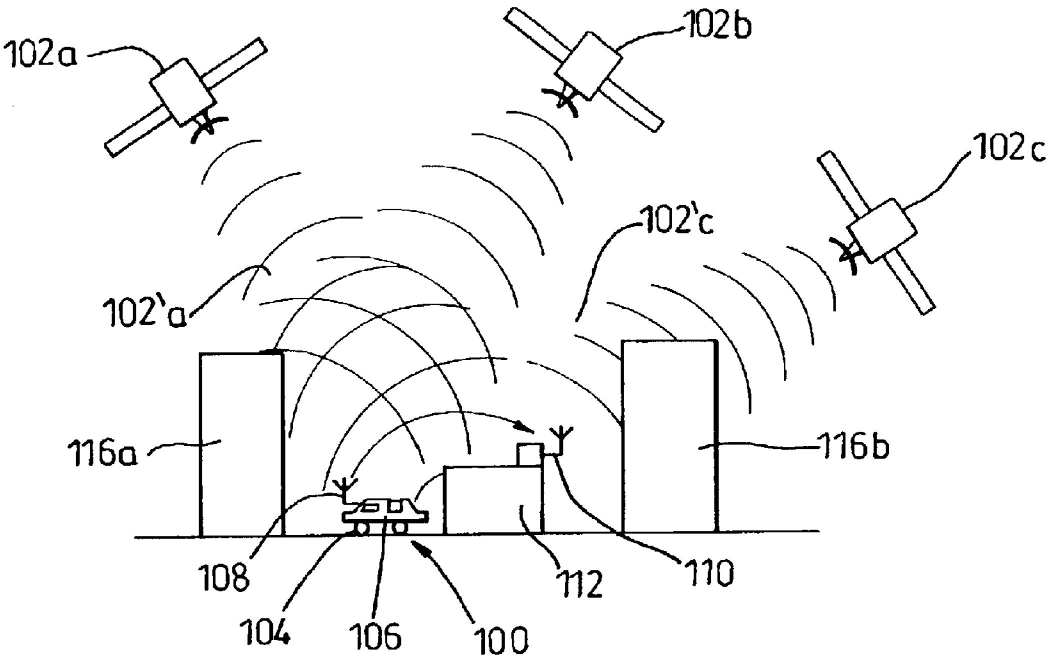
Fig. 1 (PRIOR ART)
FIG. 1 is a schematic diagram of a prior art GPS based tracking system.

FIG. 1 shows a prior art global positioning system (GPS) based tracking system 100. The system 100 comprises three GPS satellite transmitters 102*a–c*, a vehicle 104 having therein a GPS receiver 106 and a transceiver 108 therein and a remote receiver 110.

The three GPS satellite transmitters 102*a–c* are in precise geosynchronous orbits above the earth and broadcast signals which the GPS receiver 106 can triangulate and accurately determine the position of the vehicle 104. When the tracking system 100 is activated, typically from a remote operations centre 112 by the manual activation of a cellular telecommunications link 114 between the operations centre 112 and the transceiver 108, the transceiver 108 transmits the location of the vehicle 104 to the operations centre 112.

The arrangement has a number of disadvantages including the obscuration of the vehicle 104 from the line of sight of the satellites 102*a,c* in FIG. 1 by the partial wavefronts 102'*a,c*) by buildings 16*a,b*. This, along with multiple reflection of wavefronts from the buildings 112, 116*a,b*, results in the inaccurate or imprecise determination of the vehicle's location as it prevents accurate triangulation in the urban environment.

Additionally, during times of military and political tensions intentional errors are introduced into the GPS system by the military in order to prevent its utilisation by an enemy. This prevents the accurate determination of the vehicle's location. The GPS system may even be made unavailable for civilian users entirely in the future.

Figure 2:
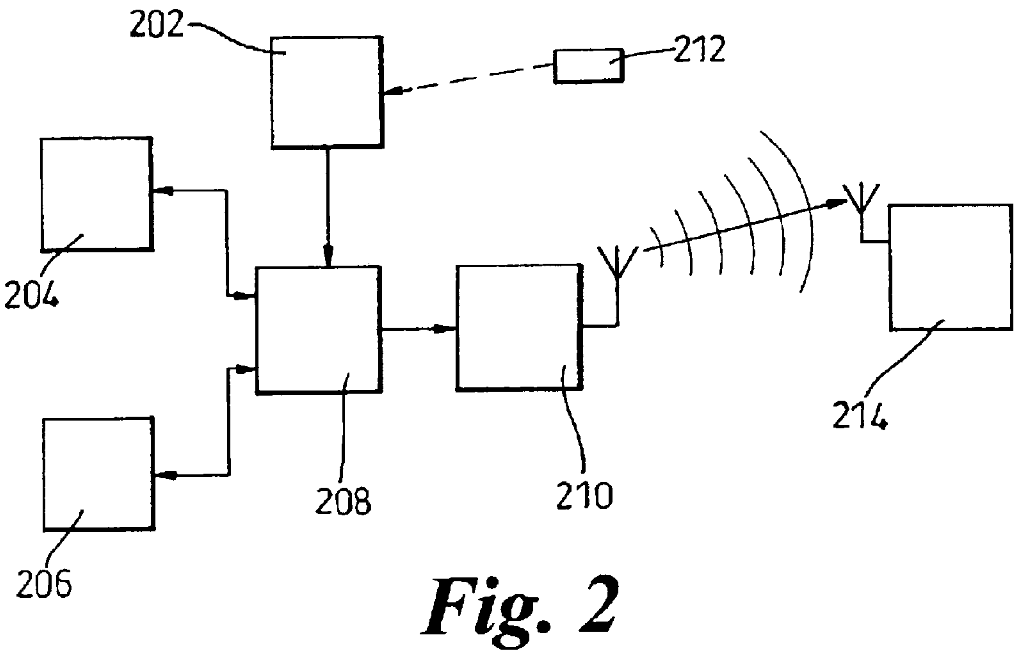
FIG. 2 is a block diagram of the components of a tracking system according to an aspect of the present invention.

Referring now to FIG. 2, a tracking system 200, which does not utilise triangulation in order to determine it's location, typically for use in a motor vehicle such as a car, comprises an arming unit 202, a motion sensor 204, a direction sensor 206, a processor 208 and a cellular transceiver 210. In this embodiment the motion sensor 204 acts as an activation means such that the system 200 becomes active once the processor 208 receives a positive indication of motion from the motion sensor 204.

In use, the arming unit 202 receives an input, typically from a locking device 212 used to lock or secure the vehicle against theft. The locking device 212 can be an infrared coded transmitter, a key and lock arrangement, or a keypad for an engine immobiliser. Upon the locking device 212 being activated the arming unit 202 sends a signal to the processor 208. The processor 208 sends activation signals to the motion sensor 204, typically a distance meter (e.g. the vehicle's odometer), velocimeter, accelerometer, or recounter, and the direction sensor 206, typically a compass or a gyroscope in response to the signal from the arming unit 202.

The motion sensor 204 and the direction sensor 206 are typically electronic, digital devices. However, should they be non-electronic devices, there will be provided suitable monitoring circuitry arranged to enable the sensors 204, 206 to be monitored. It is to this monitoring circuitry that the activation signal will be sent.

Provided that the motion sensor 204 does not detect any movement no signal is sent to the processor. However, as soon as the motion sensor 204 detects motion of the vehicle it sends a signal to the processor 208, which then interrogates the direction sensor 206 to determine the direction of travel of the vehicle.

The processor 208 passes either the raw distance and directional information or further processed information that contains an evaluated position signal of the location of, for example, a vehicle containing the system 200, to the transceiver 210 from where it is transmitted to a base station 214. The base station 214 will typically be a mobile telecommunications device belonging to the vehicle's owner such as a mobile telephone or a PDA. Alternatively or additionally, the base station 214 may be provided at an associated receiver at a tracking station or law enforcement agency. The base station may comprise a PC.

The processor 208 polls the sensors 204, 206 periodically, typically every few seconds, or possibly at longer intervals such as every 15 seconds and takes a direction and a distance reading that it then passes to the transceiver 210 for transmission to the base station 214. Alternatively, the sensors 204, 206 may be arranged to send information to the processor 208 for transmission in response to a change in either the direction of travel or after a pre-set amount of distance of travel. The size of the change in direction of travel and/or the pre-set distance of travel are usually factor set values and will typically be around 15° and 0.16 km.

If a GSM connection between the transceiver 210 and the base station 214 is used it is advantageous to open a fresh connection between the transceiver 210 and the base station 214 each time the transfer of data is required as charges for GSM services are based upon a connection duration. However, if a GPRS or G3 connection is used a constantly open connection between the transceiver 210 and the base station 214 is feasible as charges are made on the basis of bandwidth utilisation in both 3G and GPRS rather than connection duration.

The motion sensor 204 can either measure the distance directly, in the case of a distance meter, for example a mileometer, or can be an indicator of distance, for example a velocimeter and/or accelerometer arrangement. In the case of a velocimeter and/or accelerometer arrangement the distance travelled can be calculated by monitoring the amount of time spent at each velocity and/or acceleration and applying basic kinematic models. A clock for this purpose will typically be provided as a sub-routine in the processor.

The locking device 212 may be a keypad as described hereinbefore. Should the motion sensor 204 not be an electronic device that is directly sampled by the processor 208 an initial starting distance value can be entered to the processor 208 by the vehicle's owner as they arm the system 200.

Additional distance can be incremented to this initial value by monitoring circuitry in order to give an additional overall distance count.

Alternatively, whether or not the motion sensor 204 is electronic and can be directly sampled by the processor 208, there is a counter provided within a sub-routine running on the processor 208 that is reset to zero each time the arming unit 202 sends the arming signal to the processor 208. The counter increments in line with the distance/distance indicator signals received from the motion sensor 204 by the processor 208. Thus, the counter effectively becomes a 'trip counter' for the journey that is being monitored.

The processor 208 can also generate and store a log of the movement of the vehicle by recording the direction of travel and aggregate distance of travel to a file each time the processor 208 receives signals from the sensors 204, 206. The movement log can be downloaded either to a mobile telecommunications device via the transceiver or to a PC in order to provide analysis of the vehicle's movements, for example to check if delivery drivers have deviated from their planned routes.

Figure 3:
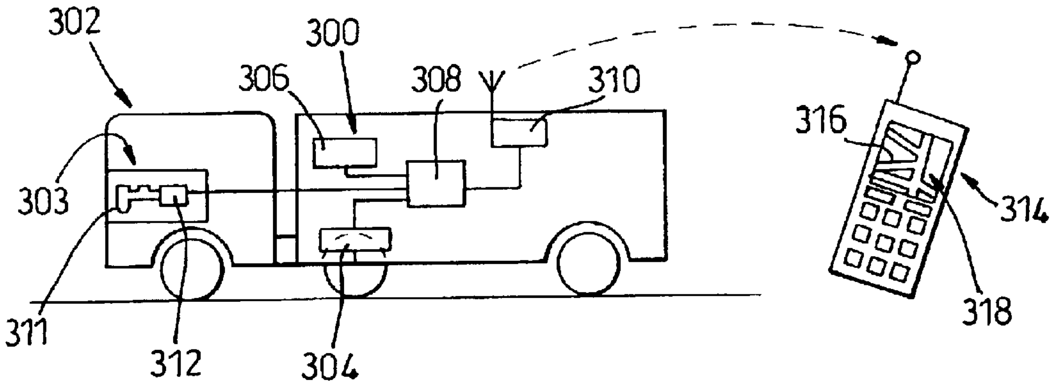
FIG. 3 is a schematic diagram of a first embodiment of the tracking system of FIG. 2.

Referring now to FIG. 3 a tracking system 300 is installed in a vehicle 302 and comprises an arming unit, a digital distance meter 304, a digital compass 306, a processor 308 and a GPRS transceiver 310.

The arming unit 303 comprises a key 311 and lock 312 combination. As the key 311 is turned in the lock 312 to a locked configuration the arming unit 303 sends a signal to the processor 308 which in turn interrogates the distance meter 304 and the compass 308 directly.

The processor 308 stores the initial distance meter reading and the initial measured compass heading. If the vehicle 302 is not moved prior to the key 311 being turned in the lock 312 to an unlocked configuration no further action is taken and the tracking system 300 is disarmed upon the arming unit 303 being in the unlocked configuration.

However, should the vehicle 302 be moved, as sensed by either the distance meter 304, for example registering an increase in the distances registered thereupon of a 0.16 km or more, or the compass 306, for example registering a significant, typically more than 15°, a signal is sent by the sensor registering the change to the processor 308. The processor 308 interrogates the distance meter 304 and the compass 306 at regular intervals thereafter, typically between every 10 to 30 seconds. The total distance travelled and the net direction of travel can be ascertained from the final readings recorded. Also the total distance and net direction of travel can be sub-divided into time slots and the direction and distance travelled in any time slot can be found.

Once the system 300 is armed the GPRS transceiver opens a communication channel to a mobile telephone 314 belonging to the vehicle's owner. In the case of a GPRS mobile telephone it would be usual in this case to leave the channel permanently open as the user pays for the amount of bandwidth that he/she uses not the amount of time for which the connection is open.

The processor 308 passes each of the distance meter and compass readings to the transmitter to be sent to the mobile telephone 314, typically as a SMS text message. Alternatively, the processor 308 contains a file corresponding to a map 316 containing the vehicle's initial location, which can be entered manually via a keypad typically as an address or a grid reference.

The map 316 can be downloaded over the communication channel from the system 300 to the telephone 314 and a marker displayed upon a screen 318 of the phone in order that the vehicle's owner can track it and can if necessary call a law enforcement agency.

Whilst detailed hereinbefore as a mobile telephone it will be appreciated that any suitably configured electronic device containing a GPRS transceiver will suffice as a receiver for the distance meter and compass readings, for example a suitably configured PC or a PDA.

Figure 4:
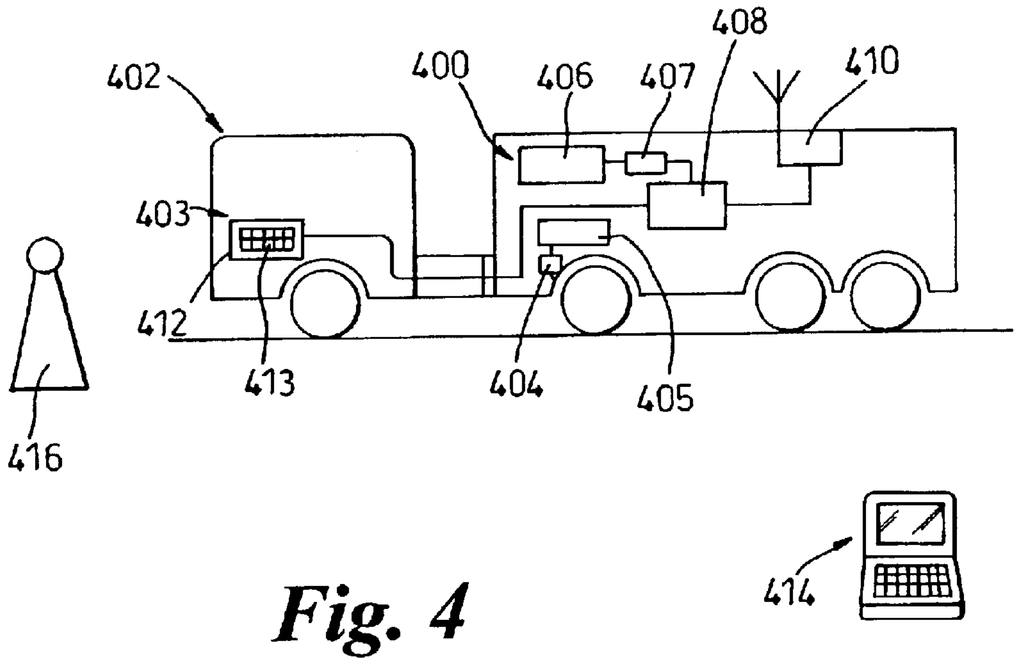
FIG. 4 is a schematic diagram of a second embodiment of the tracking system of FIG. 2 showing a waymarker.

Referring now to FIG. 4 a tracking system 400 is installed in a vehicle 402 and comprises an arming device 403, an analogue velocimeter/accelerometer arrangement 404 with monitoring circuitry 405, an analogue gyroscope 406 with sensing circuitry 407, a processor 408 and a GPRS transceiver 410.

In this embodiment the arming device 403 is an engine immobiliser 412 that is activated by entering a code at a keypad 413. Upon activation of the immobiliser 402, by the entry of an arming code at the keypad a signal is sent to the processor 408 that activates the tracking system 400.

Once activated the monitoring circuitry 405 and the sensing circuitry 407 monitor the motion of the vehicle 402 constantly. The circuitry 405, 407 send signals to the processor 408 when a significant change in velocity, typically more than 2 $ms^{-1}$, acceleration, typically more than 5 $ms^{-2}$, or direction, typically more than 15°, is noted. The processor 408 has a clock routine running thereupon that is used by the processor to convert the velocimeter and accelerometer readings into distances using known simple kinematic equations, e.g. $s=ut+\frac{1}{2}at^2$.

Each time the tracking system 400 is armed a counter routine within the processor 408 is reset. This counter is incremented by a distance corresponding to the distance determined from the velocimeter and accelerometer readings.

The GPRS transceiver 410 establishes a connection with a telecommunications device 414, in this case a suitably configured PC resident at the vehicle owner's base. The GPRS transceiver 410 passes the distance and direction information to the PC 414.

Both the velocimeter/accelerometer arrangement 404 and the gyroscope 406 are subject to inaccuracies and drift over time, as are distance meters, whether they are analogue or digital. A waymarker 416 broadcasts a signal containing information relating to its exact geographical location. The transceiver 410 receives the waymarker's signal and passes it to the processor 408. The processor 408 then resets the counter routine which proceeds to increment from a precisely defined geographical location. A signal containing the location of the waymarker is sent to the PC 414.

It will be appreciated that although shown as digital devices the distance meter and compass of FIG. 3 may be analogue with appropriate monitoring and/or sensing circuitry and correspondingly the analogue velocimeter/accelerometer arrangement and gyroscope may be digital devices. It will further be appreciated that the distance measuring devices may be replaced with such devices as fuel tank weight monitors or engine revolution counters. Any suitable combination of distance metering arrangements and/or direction monitoring arrangements disclosed hereinbefore may be employed to realise a tracking system in accordance with the first aspect of the present invention.

It will further be realised that an infrared coded 'key' transceiver may be used to arm a tracking system in accordance with the present invention.

It will also be realised that any mobile telecommunications standard, for example, GSM, G3, UTMS, GPRS may be used to transmit details of the distance and direction travelled by the vehicle, in use.

Figure 5:
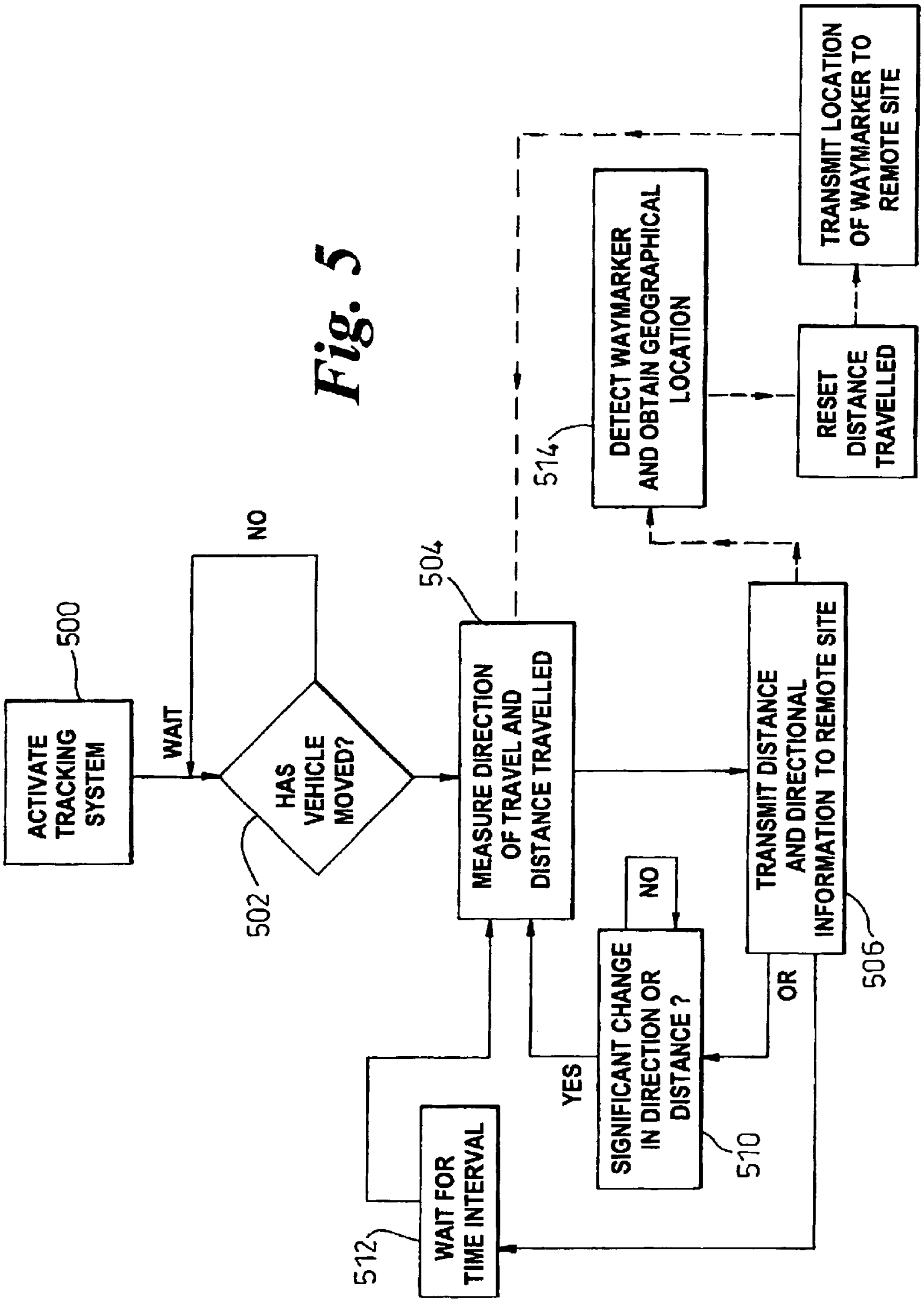
FIG. 5 is a schematic diagram of a motor vehicle including the tracking system of FIG. 2.

Referring now to FIG. 5, this is a flowchart detailing the steps of a method tracking an object, for example a vehicle. A tracking system is activated (Step 500), typically by a key, or coded input as described hereinbefore. Direction and distance sensors, of the types described hereinbefore, are interrogated by the processor to ascertain if the vehicle has moved (Step 502), if it has not moved the system waits and interrogates the sensors after a time delay, typically 30 seconds or so.

If the movement of the vehicle is detected the direction and distance sensors are used to measure the direction and distance travelled by the vehicle (Step 504). This information is passed to a mobile telecommunications transceiver and transmitted to a remote monitoring site (Step 506).

The sensors self-monitor to see if there is a significant change in either distance or direction (Step 508), if there is not they continue to self-monitor. However, if a significant change is noted in either distance or velocity the sensors measure the direction and distance of travel again (Step 504). Alternatively, the sensors are arranged to wait a predetermined time (Step 510) before measuring the direction and distance of travel (Step 512).

The transceiver may detect a waymarker and receive a signal therefrom containing detailed information relating to the geographical location of the waymarker (Step 514). The processor resets the measure of the distance travelled (Step 516) and the transceiver transmits the detailed location information relating to the waymarker to the remote monitoring site (Step 518). The sensors start measuring the direction of travel and the distance of travel from a precisely defined datum (Step 504), i.e. the location of the waymarker.

It will be appreciated that there are known proposals, for example the disclosure of WO98/01769, where a device is adapted to triangulate signals from a plurality of emitters placed at known locations. This is different from a system which is simpler and cannot do that, but instead uses "dead reckoning" to establish the position of the vehicle. Correcting the estimated current position of a vehicle as it passes a waymarker is simple technology to compensate for drift and accumulated errors. Being able to have the device provide, upon request, a past history of where the vehicle has been since the alarm was activated is beneficial in comparison with a system which can only report upon its present position.

There are a number of distinctions of embodiments of the present invention over WO98/01769 for example the structure/software running on the control processor of the device is not configured to be able to triangulate the position of the device from received triangulation signals; and/or there is no structure or software configured to evaluate signal strengths of received triangulation signals. A receiving antenna of embodiments which can detect waymarker signals indicative of their position is typically not a directional antenna.

What is claimed is:

1. A tracking system, which is adapted to track an object independently of the processing of directionally dependent broadcast signals, comprising an arming unit, a motion detection device, a direction detection device, processing circuitry, a transmitter and an activation device; the arming unit being switchable so as to place the tracking system in either an armed state or an unarmed state, the activation device being arranged to activate the tracking system when the system is in an armed state, the direction detection device and the motion detection device being arranged to output signals indicative of the direction of travel and distance travelled, respectively, to the processing circuitry when the system is activated, the processing circuitry being arranged to act upon said signals so as to generate an output indicative of the distance and direction of travel, the transmitter being actuable to transmit the output of the processing circuitry to a remote receiving station.

2. A system according to claim 1 arranged to track the object independently of measuring signal strengths of each of a plurality of substantially simultaneously broadcast signals.

3. A system according to claim 1 wherein the transmitter is arranged to transmit data as any one of: a burst of a single distance/direction pair, a plurality of distance/direction pairs or a continual feed of distance/direction pairs.

4. A system according to claim 1 wherein the transmitter is arranged to transmit a signal to the base station that is indicative of the overall distance travelled and the net direction of travel since the activation of the tracking system.

5. A system according to claim 1 wherein the transmitter is arranged to receive a signal from a waymarker.

6. A system according to claim 5 wherein the waymarker's signal contains details of its geographical location.

7. A system according to claim 6 wherein the transmitter is arranged to transmit the details of the waymarker's geographical location to the remote receiving station.

8. A system according to claim 1 wherein the activation device is any one, or combination of, the following: the motion detection device, the direction detection device, an engine monitoring device, a vibration sensing device, a device engine emission sensing means, a braking monitoring device.

9. A system according to claim 1 housed in a motor vehicle and arranged to track the motor vehicle when activated.

10. A method of tracking an object, independently of measuring signal strength of directionally dependent broadcast signals, comprising the steps of:

(i) switching a tracking system into either an armed state or an unarmed state;

(ii) activating the tracking system when the tracking system is in the armed state;

(iii) detecting motion of the object corresponding to at least a direction of travel and a distance of travel of the object;

(iv) outputting a signal indicative of the detected motion to a processing system when the tracking system is in the armed state;

(v) determining direction and distance of travel based upon the detected motion of the object;

(vi) generating an output from the processing system that is indicative of the determined direction and distance of travel; and (vii) transmitting the generated output indicative of the determined direction and distance of travel to a remote receiving station.

11. The method of claim 10 including estimating the object's current location from its last known position and the aggregate direction and of travel.

12. The method of claim 10 including activating the tracking arrangement by a signal from a motion detection device or other object use detection device.

13. The method of claim 10 including transmitting a burst of direction and distance information relating to the period since the last transmission.

14. The method of claim 10 including receiving a signal from a waymarker by the tracking system, containing within the signal details of the waymarker's geographical location.

15. The method of claim 14 including transmitting details of the waymarker's geographical location to the remote receiving station.

16. The method of claim 14 including providing a distance meter in the system and resetting the distance meter upon receiving a signal from a waymarker.

17. A motor vehicle including a tracking system which is adapted to track an object independently of the processing of directionally dependent broadcast signals, comprising an arming unit, a motion detection device, a direction detection device, processing circuitry, a transmitter and an activation device; the arming unit being switchable so as to place the tracking system in either an armed state or an unarmed state, the activation device being arranged to activate the tracking system when the system is in an armed state, the direction detection device and the motion detection device being arranged to output signals indicative of the direction of travel and distance travelled, respectively, to the processing circuitry when the system is activated, the processing circuitry being arranged to act upon said signals so as to generate an output indicative of the distance and direction of travel, the transmitter being actuable to transmit the output of the processing circuitry to a remote receiving station.

18. A tracking system for tracking an object an object comprising an arming unit, a motion detection device, a direction detection device, processing circuitry, a transmitter and an activation device; the arming unit being switchable so as to place the tracking system in either an armed state or an unarmed state, the activation device being arranged to activate the tracking system when the system is in an armed state, the direction detection device and the motion detection device being arranged to output signals indicative of the direction of travel and distance travelled, respectively, to the processing circuitry when the system is activated, the processing circuitry being arranged to act upon said signals so as to generate an output indicative of the distance and direction of travel, the transmitter being actuable to transmit the output of the processing circuitry to a remote receiving station, the processing circuitry not being adapted to perform either of signal strength measurements or direction of signal determinations upon signals received from each of a plurality of transmitters in order to triangulate the position of the object.

19. A tracking system, which tracks an object independently of the processing of directionally dependent broadcast signals, comprising an arming unit, an accelerometer, a compass, processing circuitry, and a cellular transceiver; the arming unit being switchable so as to place the tracking system in either an armed state or an unarmed state, the accelerometer being arranged to activate the tracking system when the system is in an armed state, the compass and the accelerometer being arranged to output signals indicative of the direction of travel and distance travelled, respectively, to the processing circuitry when the system is activated, the processing circuitry being arranged to act upon said signals so as to generate an output indicative of the distance and direction of travel, the cellular transceiver being actuable to transmit the output of the processing circuitry to a remote receiving station.

20. The method of claim 10, wherein detecting motion of the object further comprises detecting acceleration of the object.

21. The method of claim 10, wherein detecting motion of the object further comprises detecting velocity of the object.

22. The method of claim 10, wherein measuring the direction and distance of travel further comprises determining direction and distance of travel based upon time, velocity and acceleration of the object.

23. The system of claim 1, further comprising a velocimeter wherein the generated output indicative of the distance and direction of travel is determined from information provided by the velocimeter.

24. The system of claim 1, further comprising:

an accelerometer; and a clock, wherein the generated output indicative of the distance and direction of travel is determined from information provided by the accelerometer and the clock.

25. The system of claim 1, further comprising a gyroscope wherein the generated output indicative of the distance and direction of travel is determined from information provided by the gyroscope.

26. The system of claim 1, further comprising an odometer wherein the generated output indicative of the distance and direction of travel is determined from information provided by the odometer.

27. The system of claim 1, further comprising a compass wherein the generated output indicative of the distance and direction of travel is determined from information provided by the compass.

* * * * *